(12) United States Patent
Renkis

(10) Patent No.: US 7,730,534 B2
(45) Date of Patent: *Jun. 1, 2010

(54) ENTERPRISE VIDEO INTELLIGENCE AND ANALYTICS MANAGEMENT SYSTEM AND METHOD

(75) Inventor: Martin A. Renkis, Nashville, TN (US)

(73) Assignee: Smartvue Corporation, Nashville, TN (US)

( * ) Notice: Subject to any disclaimer, the term of this patent is extended or adjusted under 35 U.S.C. 154(b) by 1037 days.

This patent is subject to a terminal disclaimer.

(21) Appl. No.: 11/413,845

(22) Filed: Apr. 29, 2006

(65) Prior Publication Data

US 2006/0192675 A1  Aug. 31, 2006

Related U.S. Application Data

(63) Continuation-in-part of application No. 10/977,762, filed on Oct. 29, 2004, and a continuation-in-part of application No. 10/955,824, filed on Sep. 30, 2004, and a continuation-in-part of application No. 10/955,444, filed on Sep. 30, 2004, and a continuation-in-part of application No. 10/955,552, filed on Sep. 30, 2004, now abandoned, and a continuation-in-part of application No. 10/955,825, filed on Sep. 30, 2004, and a continuation-in-part of application No. 10/955,711, filed on Sep. 30, 2004, and a continuation-in-part of application No. 10/949,776, filed on Sep. 25, 2004, and a continuation-in-part of application No. 10/949,489, filed on Sep. 24, 2004, and a continuation-in-part of application No. 10/950,033, filed on Sep. 24, 2004, and a continuation-in-part of application No. 10/949,609, filed on Sep. 24, 2004, and a continuation-in-part of application No. 10/949,487, filed on Sep. 24, 2004, now Pat. No. 7,508,418, and a continuation-in-part of application No. 10/948,501, filed on Sep. 23, 2004.

(51) Int. Cl.
*G06F 11/00* (2006.01)
(52) U.S. Cl. .................. 726/22; 340/540; 340/541; 340/542; 348/143
(58) Field of Classification Search .................. None
See application file for complete search history.

(56) References Cited

U.S. PATENT DOCUMENTS 6,526,225 B1  2/2003  Windrem et al.

(Continued)

*Primary Examiner*—Pramila Parthasarathy
(74) *Attorney, Agent, or Firm*—Triangle Patents

(57) ABSTRACT

A wireless surveillance system and methods of operating same including a server software application that enables automated and centralized video analytics data storage and reporting capabilities as well as digital video management and/or recording device (DVM) and camera management capabilities for multiple DVMs and digital input capture devices (ICDs) such as cameras. The system includes at least one server computer operable via user interface selections that activate corresponding functions associated with the software application and the camera(s) and DVM(s) connected and operable within the system via wireless communication with each other and the server through a network and authorized access thereto. In a method for using the system, a user adds DVMs to the system by selecting a subset or the complete group of cameras related to each DVM to be added to the server application. Then, the user selects at least one of the cameras to be managed and displayed, the selection being made by the user in the user interface.

6 Claims, 11 Drawing Sheets

U.S. PATENT DOCUMENTS

| | | | |
|---|---|---|---|
| 6,559,769 B2* | 5/2003 | Anthony et al. | 340/574 |
| 7,092,369 B2* | 8/2006 | Fuccello et al. | 370/328 |
| 2001/0042114 A1 | 11/2001 | Agraharam et al. | |
| 2001/0056479 A1 | 12/2001 | Miyayama et al. | |
| 2003/0210340 A1 | 11/2003 | Frederick | |
| 2004/0075547 A1* | 4/2004 | Vojtech et al. | 340/500 |
| 2004/0246128 A1 | 12/2004 | Menard | |

* cited by examiner

FIGURE 3

73: EV Interface - Reporting

DVRs
- ☒ Chicago #2
- ☒ New York #7B
- ☒ New York #7B
- ☒ Seattle #34
- ☐ Chicago #2
- ☐ Portland #56
- ☒ San Jose #5
- ☐ Philadelphia #2
- ☐ Chicago #2
- ☒ Denver #245

Add | Edit | Remove

Cameras
- ☒ Chicago #2 -1
- ☒ Chicago #2 -2
- ☒ Chicago #2 -2
- ☒ New York #7B -1
- ☒ Denver #245 -1
- ☐ New York #7B -2
- ☒ Chicago #2 -2
- ☒ Chicago #2 -2
- ☒ New York #7B -1

Add | Edit | Remove

Camera Groups
- ☐ Colorado Stores
- ☐☐ Highest Shrinkage
- ☒ All New Stores

Add | Edit | Remove

| DVR | Camera | Results |
|---|---|---|
| Chicago #2 | Camera 1 | |
| Chicago #2 | Camera 2 | |
| Chicago #2 | Camera 3 | |
| New York #7B | Camera 1 | |
| New York #7B | Camera 2 | |
| New York #7B | Camera 3 | |

Graph Mode | Data Mode | Export Report | Save Report | Manage Reports | Open Report

Select Field of Interest:
1 - Couch in Lobby

Select Data to Report On:
- (x) Humans Entering Field
- (x) Humans Leaving Field
- (x) Amount of Time Spent in Field
- (x) Direction of Travel
- (x) Average Time Spent in Field
- (x) Total Humans Entered Field
- (x) Total Humans Leaving Field

Qualifiers:
- (x) Time Spent in Field
  - $\circ$ $\circ$ > = $\circ$ ≠ [00:05:00]
- ( ) Direction of Travel
  - • = $\circ$ ≠ [DIRECTION]

Select Date or Date Range:
January 5, 2005

Select Time or Time Range:
6:30AM - 5:00PM

ENTERPRISE VIDEO INTELLIGENCE AND ANALYTICS MANAGEMENT SYSTEM AND METHOD

CROSS-REFERENCE TO RELATED APPLICATIONS

This non-provisional utility patent application is related to one or more prior filed co-pending non-provisional applications as a continuation-in-part:

U.S. application Ser. No. 10/948,501, entitled "Wireless Video Surveillance System and Method, with Two-Way Locking of Input Capture Devices," filed on Sep. 23, 2004;

U.S. application Ser. No. 10/949,487 entitled "Wireless Video Surveillance System & Method with DVR-Based Querying," filed on Sep. 24, 2004 now U.S. Pat. No. 7,508,418;

U.S. application Ser. No. 10/949,609 entitled "Wireless Video Surveillance System and Method with Emergency Video Access," filed on Sep. 24, 2004;

U.S. application Ser. No. 10/950,033 entitled "Wireless Video Surveillance System and Method with Remote Viewing," filed on. Sep. 24, 2004;

U.S. application Ser. No. 10/949,489 entitled "Wireless Video Surveillance System and Method with External Removable Recording," filed on. Sep. 24, 2004;

U.S. application Ser. No. 10/949,776 entitled "Wireless Video Surveillance System and Method with Dual Encoding," filed on. Sep. 25, 2004;

U.S. application Ser. No. 10/955,552 entitled "Wireless Video Surveillance System & Method with Digital Input Recorder Interface and Setup" filed on Sep. 30, 2004 now abandoned;

U.S. application Ser. No. 10/955,825 entitled "Wireless Video Surveillance System & Method with Rapid Installation," filed on Sep. 30, 2004;

U.S. application Ser. No. 10/955,711 entitled "Wireless Video Surveillance System & Method with Input Capture and Data Transmission Prioritization and Adjustment," filed on Sep. 30, 2004;

U.S. application Ser. No. 10/955,444 entitled "Wireless Video Surveillance System and Method with Single Click-select Actions," filed on Sep. 30, 2004;

U.S. application Ser. No. 10/955,824 entitled "Wireless Video Surveillance System and Method with Security Key," filed on Sep. 30, 2004; and U.S. application Ser. No. 10/977,762 entitled "Wireless Video Surveillance System and Method for Mesh Networking" filed on Oct. 29, 2004.

FIELD OF THE INVENTION

The present invention relates generally to surveillance and sensor technology and equipment and, more particularly, to a wireless video surveillance system releasably mountable and configured to function within a track lighting system.

BACKGROUND OF THE INVENTION

While video surveillance systems have existed in the prior art, typically they are wired devices that are difficult, time-consuming, and costly to install and operate. Also, generally, the video surveillance systems are configured in standalone arrangements requiring separate power supply, an individual base or mounting with separate hardware, and limited range of data input capture due to location limitations. Also, the prior art typically does not coordinate, much less collectively compare and analyze data inputs from a multiplicity of input devices positioned at geographically remote locations and present the information to a user in a concise format for monitoring and system management.

Thus, there is a need to provide a surveillance system that includes fully functional independent surveillance devices that communicate to a remote, centralized server for collecting, analyzing and reporting data to a remote user, wherein the system is integrated and coordinated for control and management of independent devices remotely by the authorized user.

SUMMARY OF THE INVENTION

The present invention provides a wireless surveillance system and methods of operating same, providing at least one data input capture device (ICDs), including cameras which have the ability to capture video, audio, and/or data from sensors such as temperature and humidity data and further including a server software application that enables automated and centralized video analytics data storage and reporting capabilities as well as digital video management and/or recording device (DVM) and camera management capabilities for multiple DVMs and ICDs or cameras. Preferably, the server is configured, capable and operable for managing a multiplicity of DVMs and cameras, more preferably at least about 1000 DVMs. The system includes at least one remote centralized server computer operable via user interface selections that activate corresponding functions associated with the software application and the ICDs or camera(s) and DVM(s) connected and operable within the system via wireless communication with each other and the server through a network and authorized access thereto.

In a method for using the system, a user adds DVMs to the system by selecting a subset or the complete group of cameras related to each DVM to be added to the server application. Then, the user selects at least one of the cameras to be managed and displayed, the selection being made by the user in the user interface.

These and other aspects of the present invention will become apparent to those skilled in the art after a reading of the following description of the preferred embodiment when considered with the drawings.

BRIEF DESCRIPTION OF THE DRAWINGS

FIG. 3 is another user interface view illustrating reporting functions and corresponding user interface according to the present invention.

DETAILED DESCRIPTION OF THE PREFERRED EMBODIMENTS

The present invention provides a wireless surveillance system and methods of operating same, providing at least one input capture device (ICD) that is newly or retrofittably releasably mountable to a track of a track lighting system. Single or multiple ICDs are provided independently attachable and configurable for wireless communication through a digital input recorder (DIR) positioned in a location remote from the ICD. The ICD transmits the data wirelessly (using network protocols such as 802.11, cell phone protocols such as CDMA or GSM, or any other wireless protocol such as Zigbee, Bluetooth, or other) to a DVM and the DVM can store the data, report on the data and take further actions on that data, either alone or in conjunction with a remote server computer (RSC). Thus the present invention provides at least one ICD or camera in each of various locations that are connected via a network to the RSC and with coordinated data inputs and analyses thereof viewable for a user on a computer or electronic device having a display and user interface thereon. Preferably, such controllable remote access includes user viewing of captured inputs of the target environment, including live and/or historical/recorded data, storing, editing, retrieving or otherwise reviewing said inputs, and controlling the system settings and activities, and combinations thereof, as well as specific analytics or reports that may be presented in a variety of report formats for communicating the analytics and data to the system user.

Figure 1:
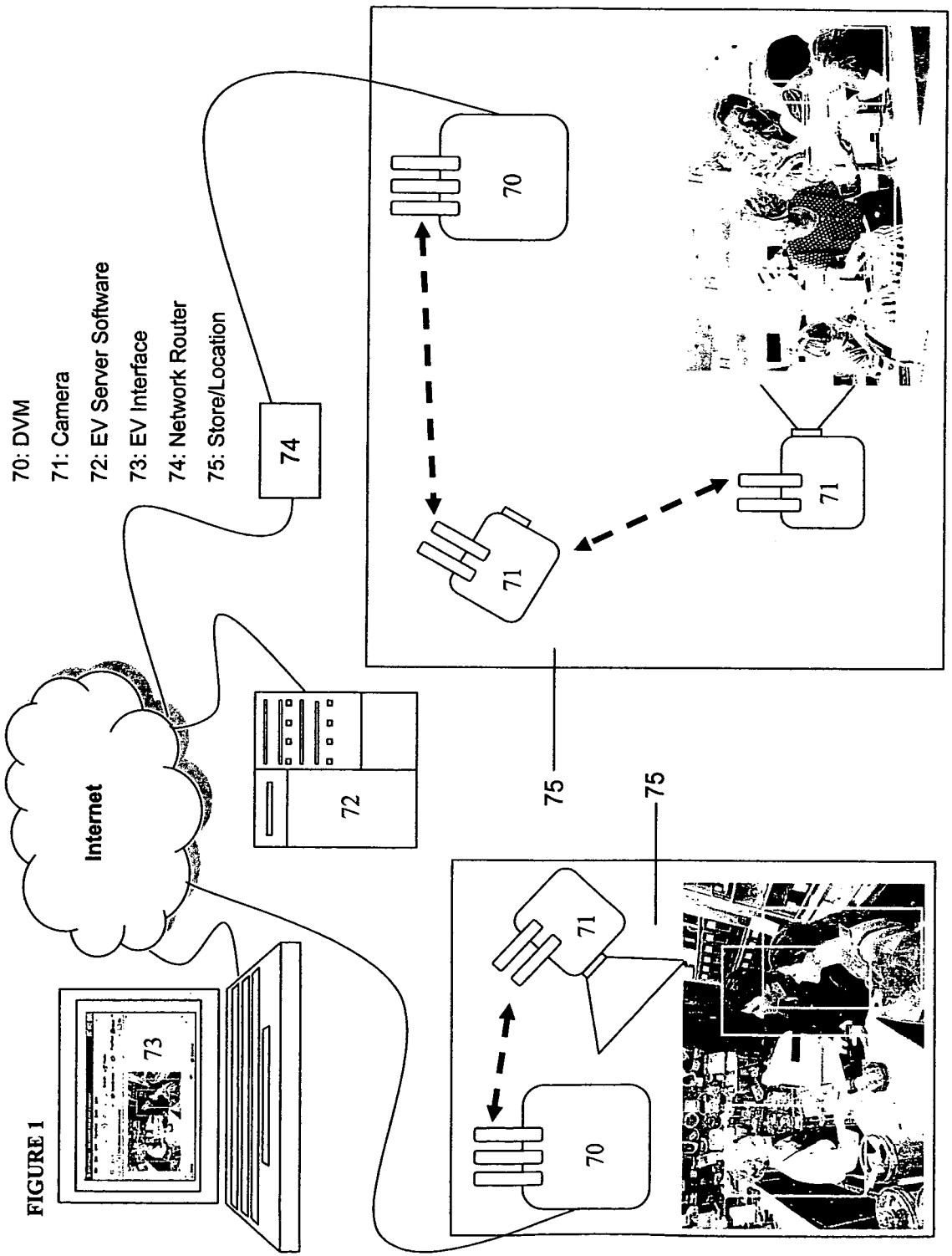
FIG. 1 is a schematic illustrating a system and componential relationships in one embodiment constructed and configured according to the present invention.
Figure 2:
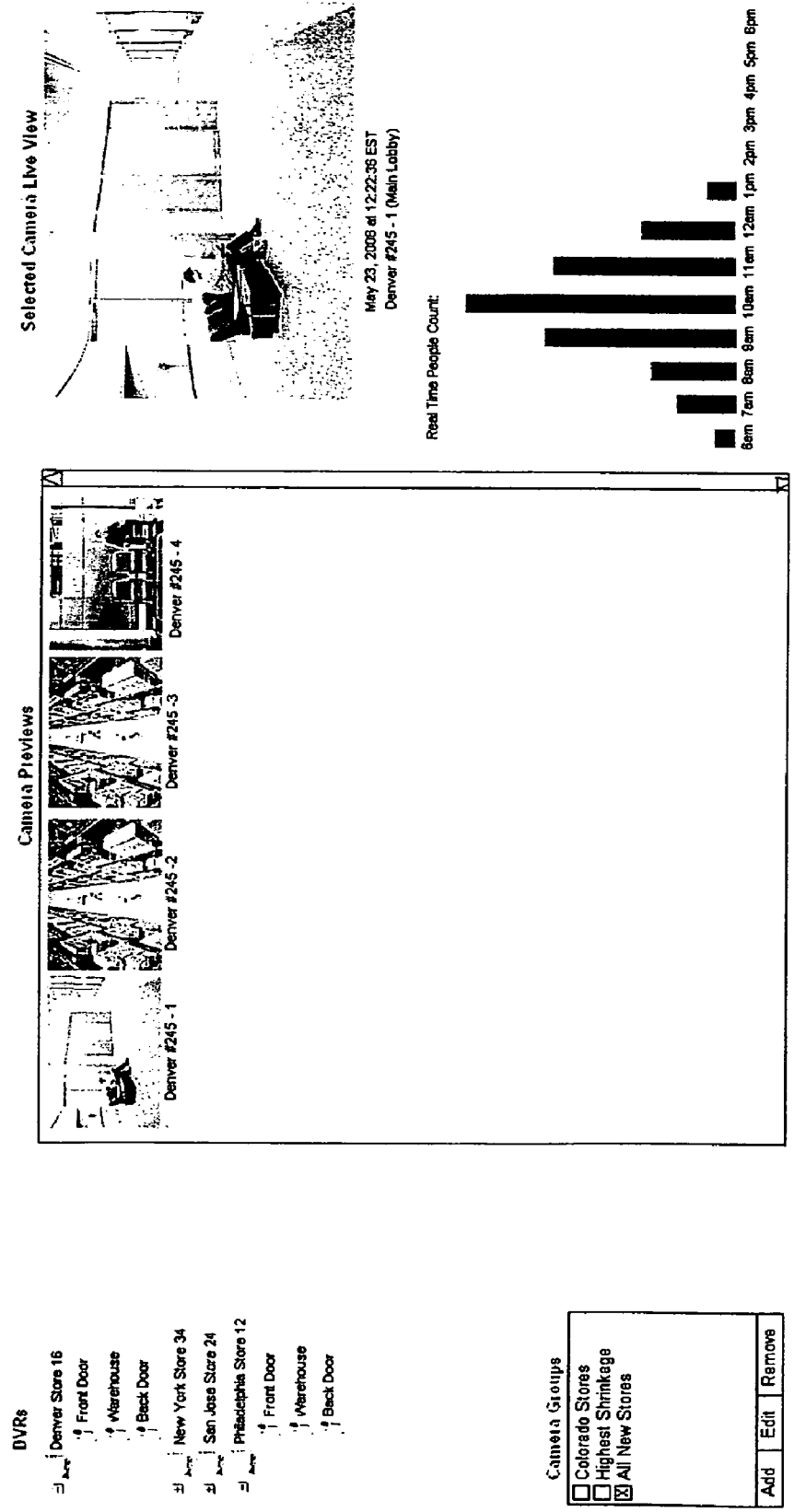
FIG. 2 is a user interface view illustrating one application and embodiment of the present invention.

In FIG. 1 a schematic illustrating a system and componential relationships in one embodiment constructed and configured according to the present invention is shown. Graphical user interfaces (GUIs) are referred to as user interfaces in this description and select user interfaces are illustrated in FIGS. 2-3. FIG. 1 shows a computer with a display and user interface 73 thereon that is viewable by a user on that computer or via a network connection such as the Internet that is in communication with a remote server computer (RSC) 72 via a network router 74. The RSC receives data input from ICDs 71 and related DVRs or DVMs 70 located at various predetermined locations 75 and configured and operable in wireless communication with the ICDs to receive data transmission therefrom.

FIG. 2 is a user interface view illustrating one application and embodiment of the present invention for a live view of visual inputs captured by ICDs of the system and enabled with live people counting functionality or analytics. FIG. 3 is another user interface view illustrating reporting functions and corresponding user interface according to the present invention. The reporting includes identification of specific ICDs or cameras and related DVRs for each of those ICDs with the corresponding results based upon the application and function settings for the system and/or those particular ICDs and DVRs, which in this illustration are geographically remote locations in different cities within the US.

For each geographic location in this illustration, there is at least one digital camera or an input capture device (ICD) having data input sensors, a processor and memory, and other functional components for its basic operation as set forth in the following description of FIGS. 4-11.

The server software application of the present invention enables automated and centralized video analytics data storage and reporting capabilities as well as digital video management and/or recording device (DVM) and camera management capabilities for multiple DVMs and cameras. Preferably, the server is configured, capable and operable for managing a multiplicity of DVMs and cameras, more preferably at least about 1000 DVMs. The system includes at least one server computer operable via user interface selections that activate corresponding functions associated with the software application and the camera(s) and DVM(s) connected and operable within the system via wireless communication with each other and the server through a network and authorized access thereto.

In a method for using the system, a user adds DVMs to the system by selecting a subset or the complete group of cameras related to each DVM to be added to the server application. Then, the user selects at least one of the cameras to be managed and displayed, the selection being made by the user in the user interface. The user interface is editable or changeable based upon selections by the user. By way of example but not limitation, the user selection to modify the user interface to display one or more of the cameras associated with a particular DVM live; the user interface is operable to permit the user to select fewer or greater camera views and/or to include different camera views live.

Initially, the user operates the system from a user interface that is the main user interface. Within the main user interface view, the system is operable based upon selections made by the user. User selection is provided from a list of DVRs within the main user interface. Following selection of at least one DVR, the system is operable to display to the user previews from any or all of the cameras associated with the DVR selected by click selecting options to Show All or Show Selected. The system is operable to display a live video stream associated with at least one camera when the user selects the at least one camera preview image option, which is displayed in the Selected Camera View area of the user interface.

When the user selects via the user interface (through click select or other selection from a predetermined listing or display of options) on any DVR available from the selection listed in the user interface, only the cameras associated with or corresponding to that DVR are displayed in the ICDs or Cameras list in the user interface, and the selected camera preview images that are displayed on the user interface in the Camera Preview list. At least one or more authorized users can check any cameras in the Camera list to add them to the Camera Previews list for viewing streaming images therefrom in the user interface. The system is operable to provide for a user to select via the user interface any preview image in the Camera Previews list to view live video from that camera which is displayed in the Selected Camera View area.

Additionally in the present invention system and method, video analytics data is automatically sent to the application. The video analytics data is based upon video information provided by each camera and corresponding DVM actively operating within the system via the network. The video analytics data includes date/time and image analytics, video trends analytics, video changes with respect to predetermined settings or initial inputs, and combinations thereof. The system is further operable to provide reports based upon the video analytics data and to permit authorized user(s) to request via the user interface to receive electronic versions of the reports associated with any single camera, a number of cameras, or all cameras corresponding to any of the DVM(s).

The system is further operable to provide for user control of all camera and analytics settings as well as run real-time video analytics reports on data live from any particular or a combination of all video intelligence data sources, wherein the user control is initiated via the user interface and selections provided through the display to the user thereon. The user interface and controls provide for and are operable for permitting the user(s) to create "fields of interest" in any video image from any camera that has been registered with the system and then track people behavior in those areas, then run reports on that behavior. The fields of interest are subsets of the displayed video image and are selected by the user via geographic With point and click ease the system can be setup to track people entering and leaving through a door. It also tracks multiple fields of interest in any video image. It can store data on the number of people to enter each field, the number of people to leave each field, the amount of time each person stays in each field, and the direction of travel of each person. This data is then displayed in user friendly reports or can be exported into a common data format for use by other analytical tools including but not limited to "standard" commercial grade software, such as Microsoft Excel.

For every DVM, the following settings can be made:

SELECT CAMERA—Selects the camera to set video analytics.

SELECT FIELD OF INTEREST—User can select any existing field of interest from the drop down list.

TRACKING OPTIONS—User checks checkboxes to select the type of data they want to track for this field.

Track People Entering Field—Track the number of people that enter this field

Track Current Number of People In this Field—Tracks how many people are the field at any given time.

Entry Direction—2 Degrees (0°-360°) can be set to determine what is the ENTRY direction (for example from the right is 1° to 180° and from left is 180° to 360°). The user can alternatively select ALL to track people who enter this field from ALL directions.

Track People Leaving Field—Track the number of people leaving this field

Exit Direction—2 Degrees (0°-360°) can be set to determine what is the EXIT direction (for example from right is 1° to 180° and from left is 180° to 360°). The user can alternatively select ALL to track people who enter this field from ALL directions.

Track Time in Field—Track how much time each person spends in this field (00:00:00 Hours, minutes, seconds) Track Direction of Travel—Track the direction of travel of each person. The direction is determined by taking the entry point and exit point and calculating the direction in degrees. For example if a person came in the right side of the screen and exited on the left side of the screen their direction of travel would be 270°.

Record Video When Tracking—Records video people are being tracked. This enables users to associate a people detection event with a video clip of that person (see reporting). Installation Height and Down Angle of the camera (optional settings the user can enter to optimize the accuracy of the analytics).

NOTIFICATION OPTIONS—Enables user to set e-mail and SMS notifications upon analytics events for this specific field on the dates and times selected.

Notify on any Field Entry—Set notification upon entering this field (notification is made when at least one person enters this field).

Notify on any Field Exit—Set notification upon leaving this field (notification is made when at least 1 person leaves this field).

Notify when Direction is (X)—Notifies the person when the travel direction of the subject is within the range specified (such as between 0° and 180° which would be the left side of the screen)

Notify when Greater than (X) People in Field—Notifies the person when more than a set number of people are in the field.

Notify when Less than (X) People in the Field—Notifies the person when less than a set number of people are in the field.

Notify when total Entry is not Equal to Total Exit—Notifies the person when the total number of people who enter the field in the specified time is not equal to the total number of people who left the field.

Notification to—Sends the user notification using the specified e-mail or sms address.

SELECT DATE AND TIME—User can select specific dates or date ranges and associated time ranges to track the data. This calendar will have to be expanded to store multiple days and times but initially may only support 1 date range and 1 time range (for example 1 day from 8 pm to 5 pm or Monday through Friday 8 am to 9 pm).

ENABLE/DISABLE—Enables tracking on this field.

CANCEL/SAVE—Cancels the operation or saves the settings.

TEST TRACKING—Enables the user to run a live test and view live results at that moment with the currently selected camera. The still image in the area should a live video stream as it displays outlines of all people as they move into the fields of interest.

To create a field of interest the user simply drags a box on the image or clicks on between 4 to 10 points to outline the field. To delete, they right click on the field and select delete. After creating a field, the user is prompted to name the field. They can right click on any field to access the following options: DELETE and EDIT NAME.

Reports can be run on any single camera, combination of cameras, pre-determined groups of cameras, pre-determined groups of DVMS, combination of DVMs. Report settings are as follows:

SELECT CAMERA—Drop down menu—user can select any single camera or ALL of them

SELECT FIELD OF INTEREST—Drop down menu—user can select any single field of interest or ALL of the SELECT DATA TO REPORT ON—user can select 1 or all of the items: 1) Peoples entering the field 2) Peoples exiting the field 3) Time spent in the field, 4) Direction of travel, 5) Average time spent in field, 6) Total peoples entering field, and 7) total peoples leaving field.

QUALIFIERS—user can select one or all of the items: 1) Time spent in the field with the following parameters: a) greater than, b) less than, c) equal to or d) not equal to plus the data point (in hours, minutes, seconds) to compare to, 4) Direction of travel, 5) Average time spent in field, 6) Total peoples entering field, and 7) total peoples leaving field or 2) Direction of travel with the parameters being a) equal to, b) not equal to plus the data point (drop down selection of the direction options).

SELECT DATE RANGE—Pop up menu gives available date ranges.

SELECT TIME RANGE—Pop up menu gives available time ranges.

RUN REPORT—Runs the report with the options selected above

CANCEL—Cancels the report

SAVE—Saves the report in the CSV format

In any of the reports a user can click select from a graphic user interface on a computer screen, electronic display of an electronic device having computing and/or communication functions, to select any PERSON ID in the report and this hyperlink will open a video playback window and playback that associated video clip. For example, in the report if a person noticed that a people had stayed in a field of interest for a very long time, they could see who it was by clicking on that data point and the video recorded from that item would be displayed. Preferably, all reports are formatted to be stored and/or operate in dynamic html or javascript to make them fast, simple, and cross platform compatible as well as removing an requirement for a runtime to be installed.

In other applications of the present invention, the system can also be set to track cars in applications for traffic control, management, planning, violations monitoring and automatic ticketing.

Figure 4:
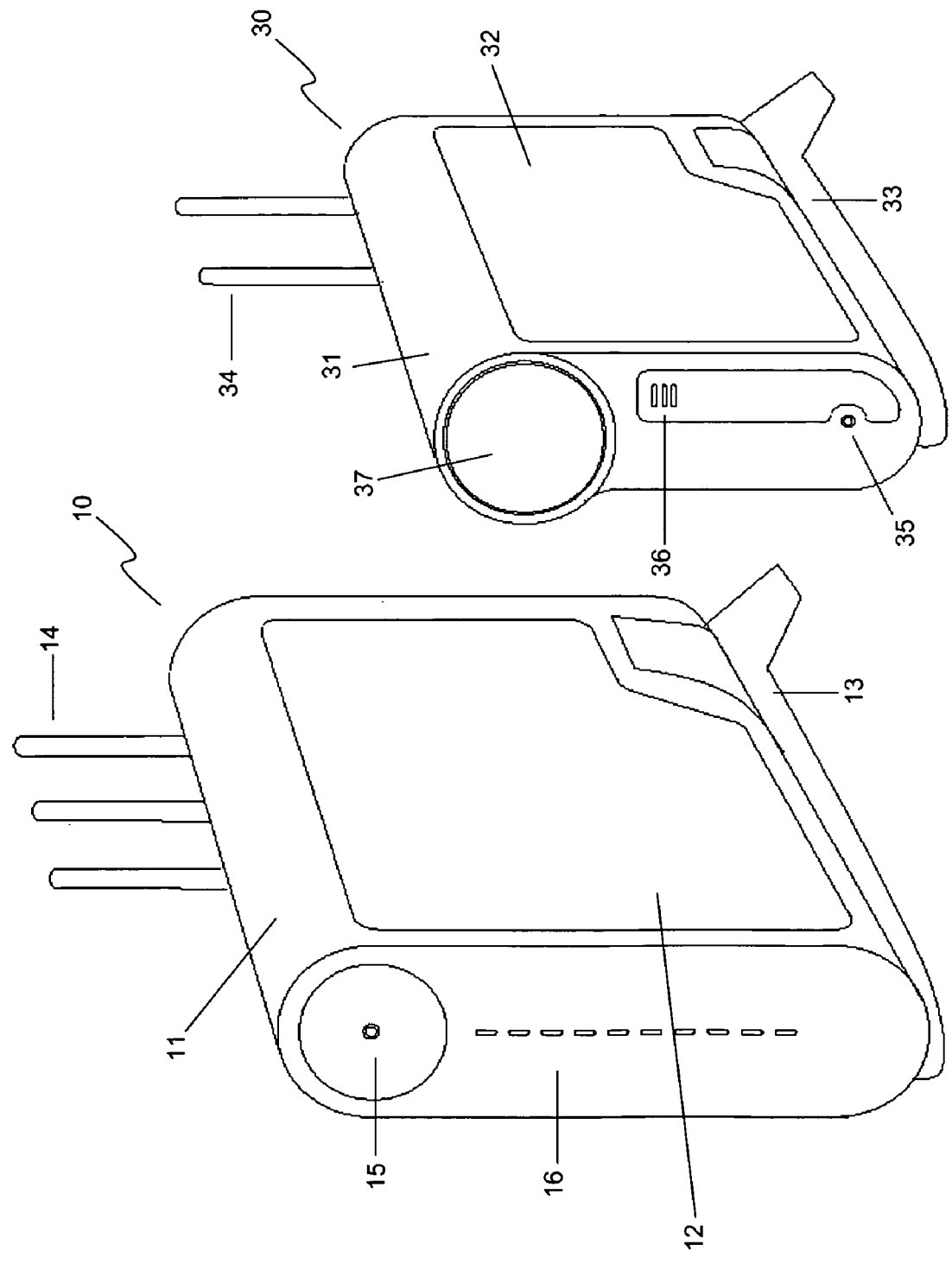
FIG. 4 is a perspective view of one embodiment showing select components of a system constructed according to the present invention, showing an input capture device and a digital input recorder juxtapositioned each other, not illustrating the track lighting mounting components.

FIG. 4 shows a perspective view of one embodiment constructed according to the present invention, showing an input capture device ("ICD"), generally referred to as 30, and a digital input recorder ("DIR"), generally referred to as 10, juxtapositioned. The DIR 10 has a plastic case 11 with a metal plate 12 affixed thereto and a removable tilt adjustable base 13 removably attached to the bottom of the DIR. Antennas 14, near the top of the DIR provide wireless communication for the present invention. A green power led and button 15 is near the top of the DIR. The button 15 can turn on the motion detection and/or record all functions of the present invention. The status indicator LEDS 26 are placed on the front of the DIR and can illuminate either red or green.

Similarly, the ICD 30 has a plastic case 31 with a metal plate 32 affixed thereto and a removable tilt adjustable base 33 removably attached to the bottom of the ICD. Antennas 34, also shown in FIGS. 1 and 2, near the top of the ICD housing provide wireless communication for the present invention with other devices such as the DIR or RSC via a wireless communication network. A power/motion detection LED 35 is positioned near the bottom of the front of the ICD and can illuminate either red or green. Another input such as a microphone 36 is also illustrated being positioned on the front of the ICD housing to detect sound. The camera lens 37 is positioned near the top front of the ICD. Other input capture device functions and operations for various inputs are preferably optimally positioned in or on the housing to provide for reasonable input intensity from the target environment.

Figure 5:
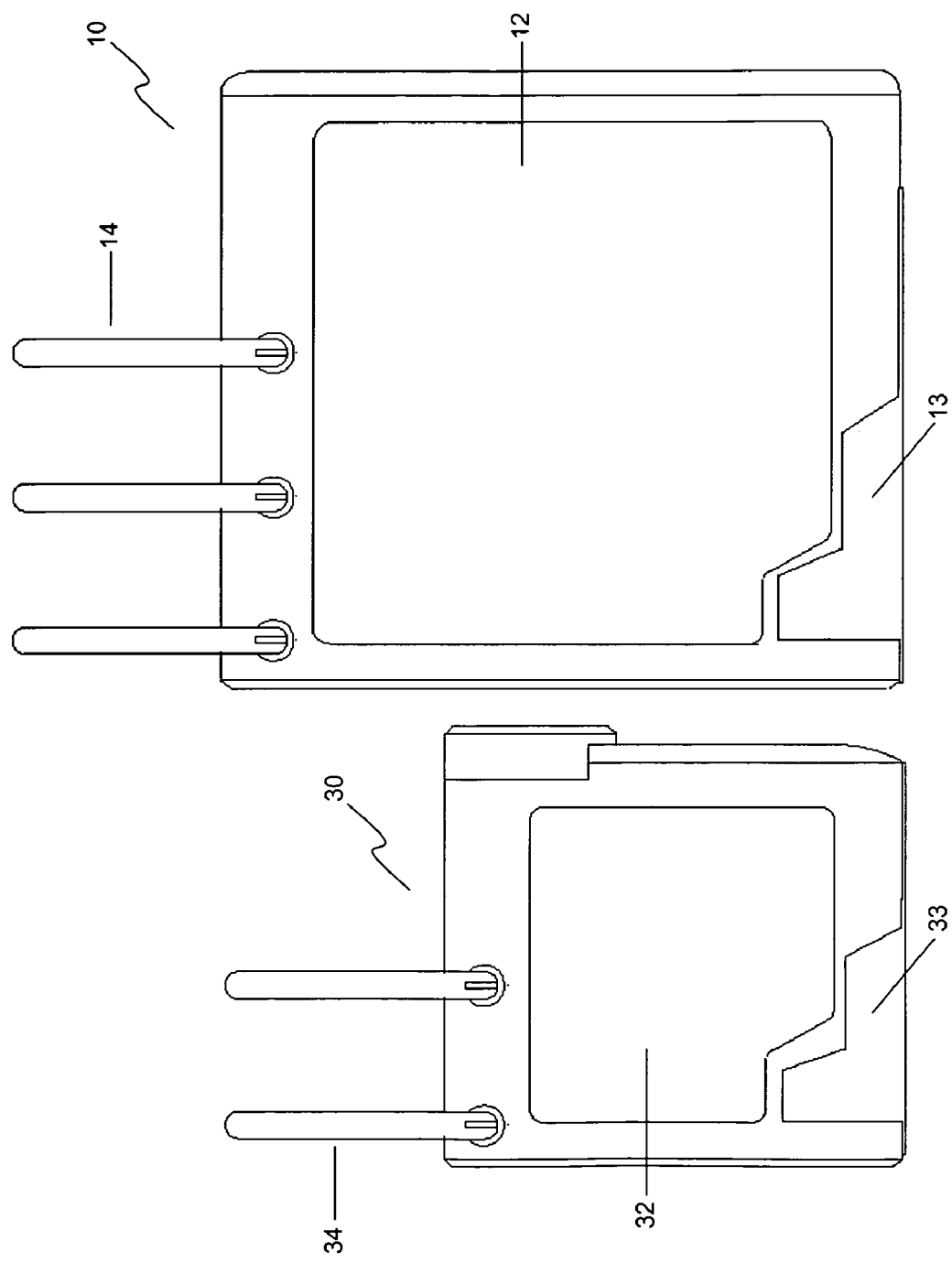
FIG. 5 is a side view of the embodiment shown in FIG. 4.

FIG. 5 shows a side view of the embodiment shown in FIG. 4, showing an ICD 30 and a DIR 10 juxtapositioned.

Figure 6:
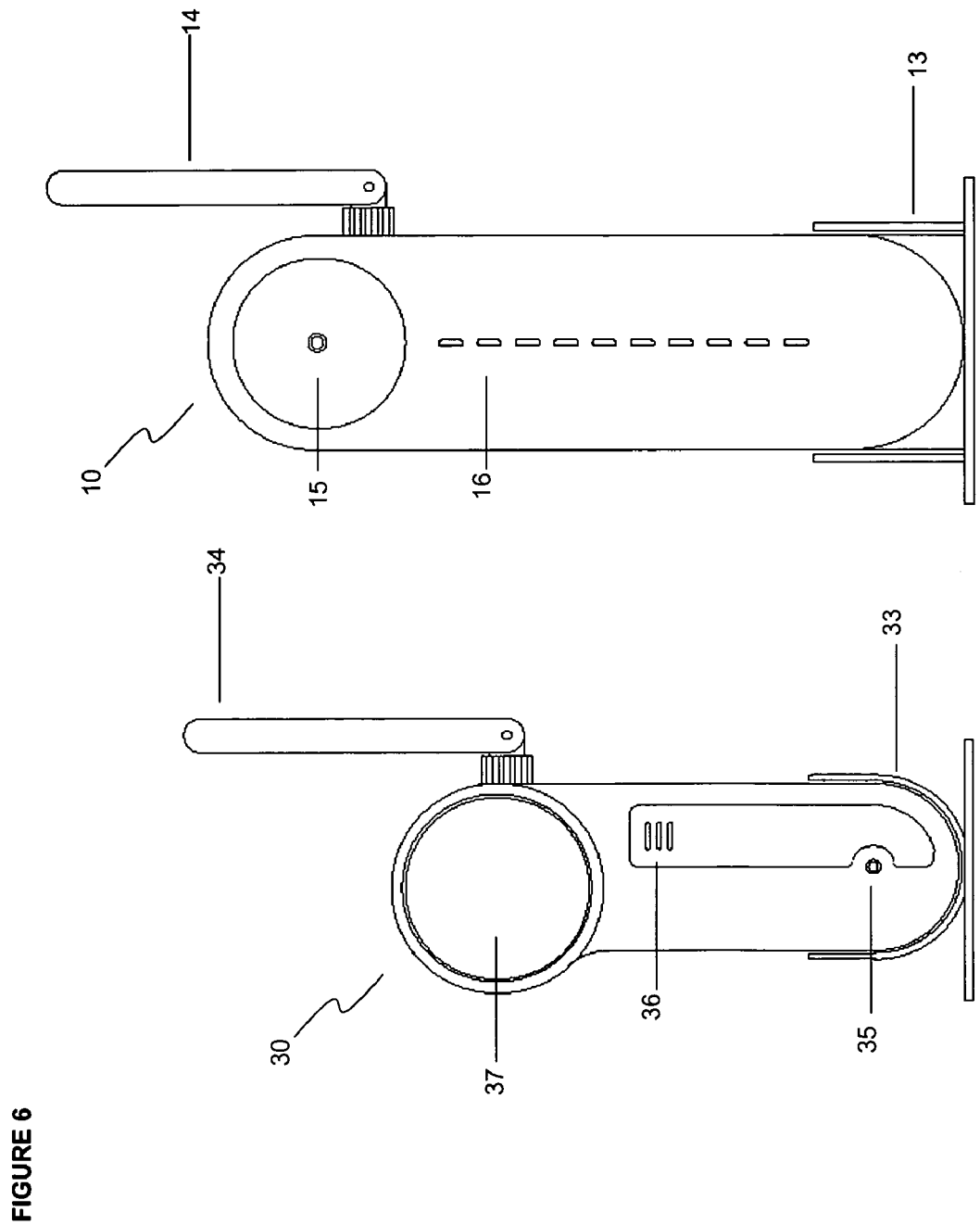
FIG. 6 is a front view of the embodiment shown in FIG. 4.

FIG. 6 shows a front view of the embodiment shown in FIG. 4, showing an ICD 30 and a DIR 10 juxtapositioned.

Figure 7:
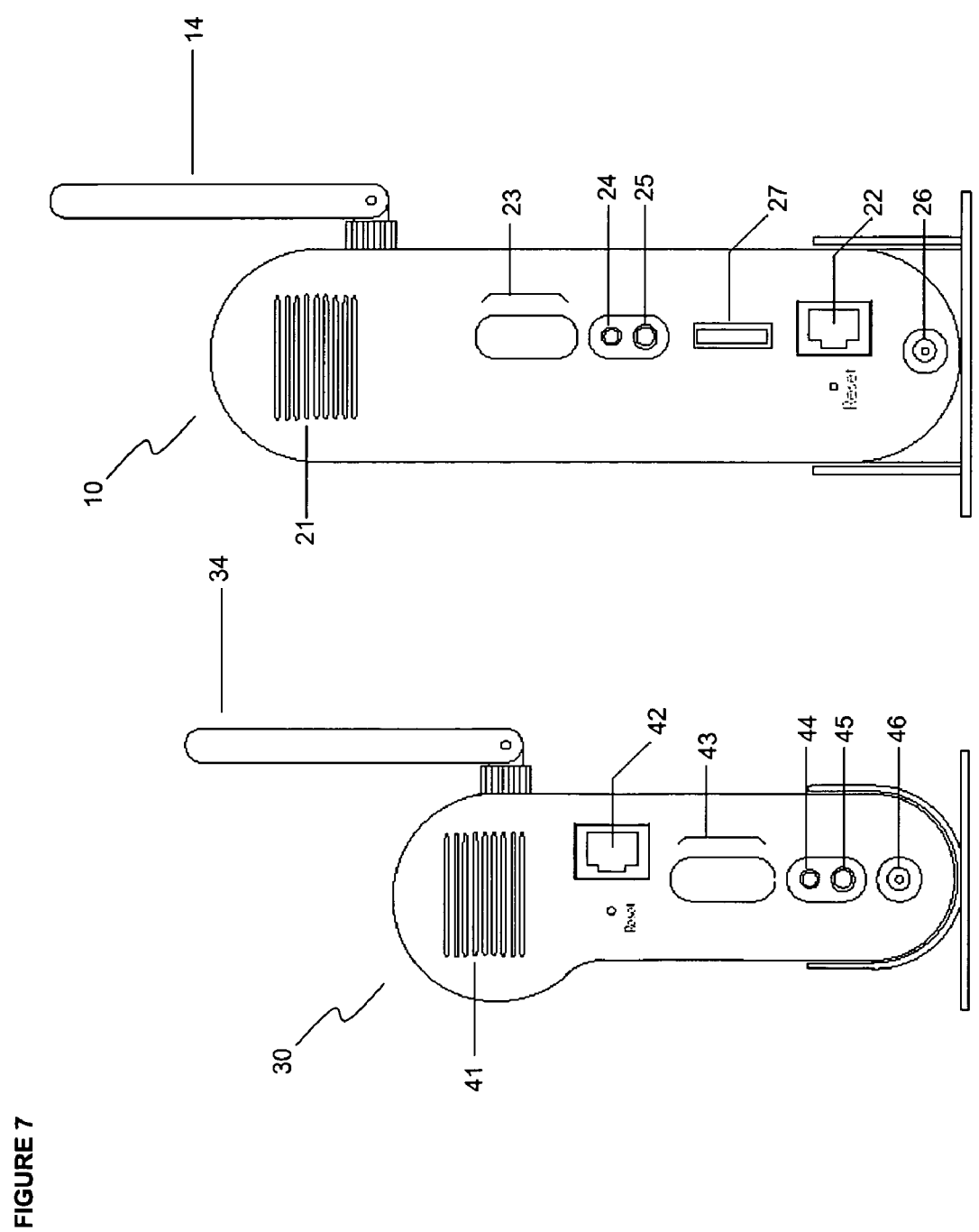
FIG. 7 is a back view of the embodiment shown in FIG. 4.
Figure 8:
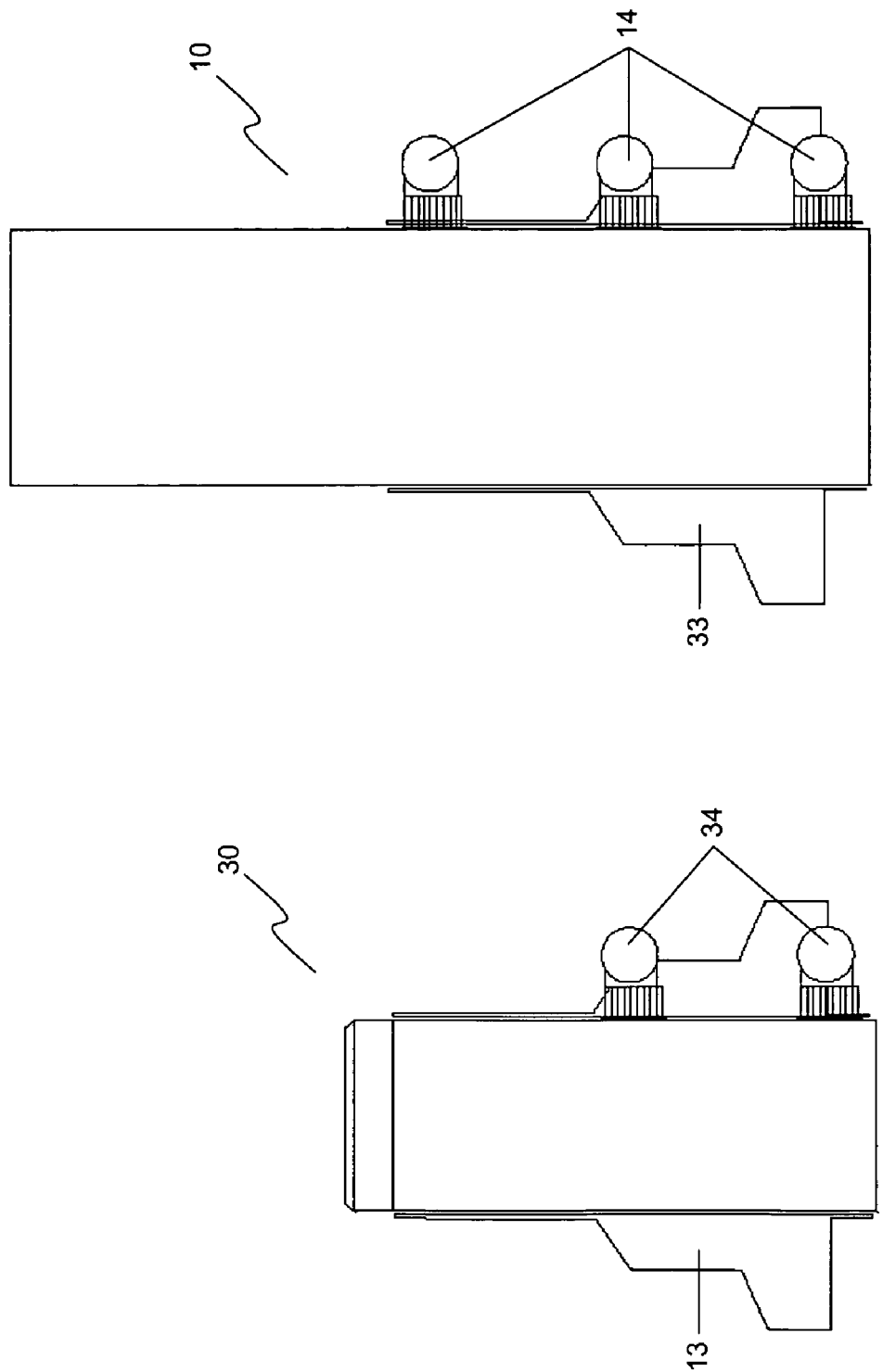
FIG. 8 is a top view of the embodiment shown in FIG. 4.

FIG. 7 shows a back view of the embodiment shown in FIG. 4, showing an ICD 30 and a DIR 10 juxtapositioned. The ICD 30 has air vents 41 to facilitate cooling of the device. FIG. 8 also illustrates the various ports that are available on the two devices. The ICD 30 has the following ports: RJ-45 42; Alarm I/O Out 43; Microphone In 44; RCA Video Out 45; and DC In 46.

Similarly, the DIR 10 has air vents 21 to facilitate cooling. Some of the ports may differ between the ICD and DIR. The DIR 10 has the following ports: RJ-45 22; Alarm I/O Out 23; Audio Out 24; RCA Video Out 25; DC In 26; and USB 27.

FIG. 8 shows a top view of the embodiment shown in FIG. 5, showing an ICD 30 and a DIR 10 juxtapositioned. This demonstrates the possible footprints of the devices.

Figure 9:
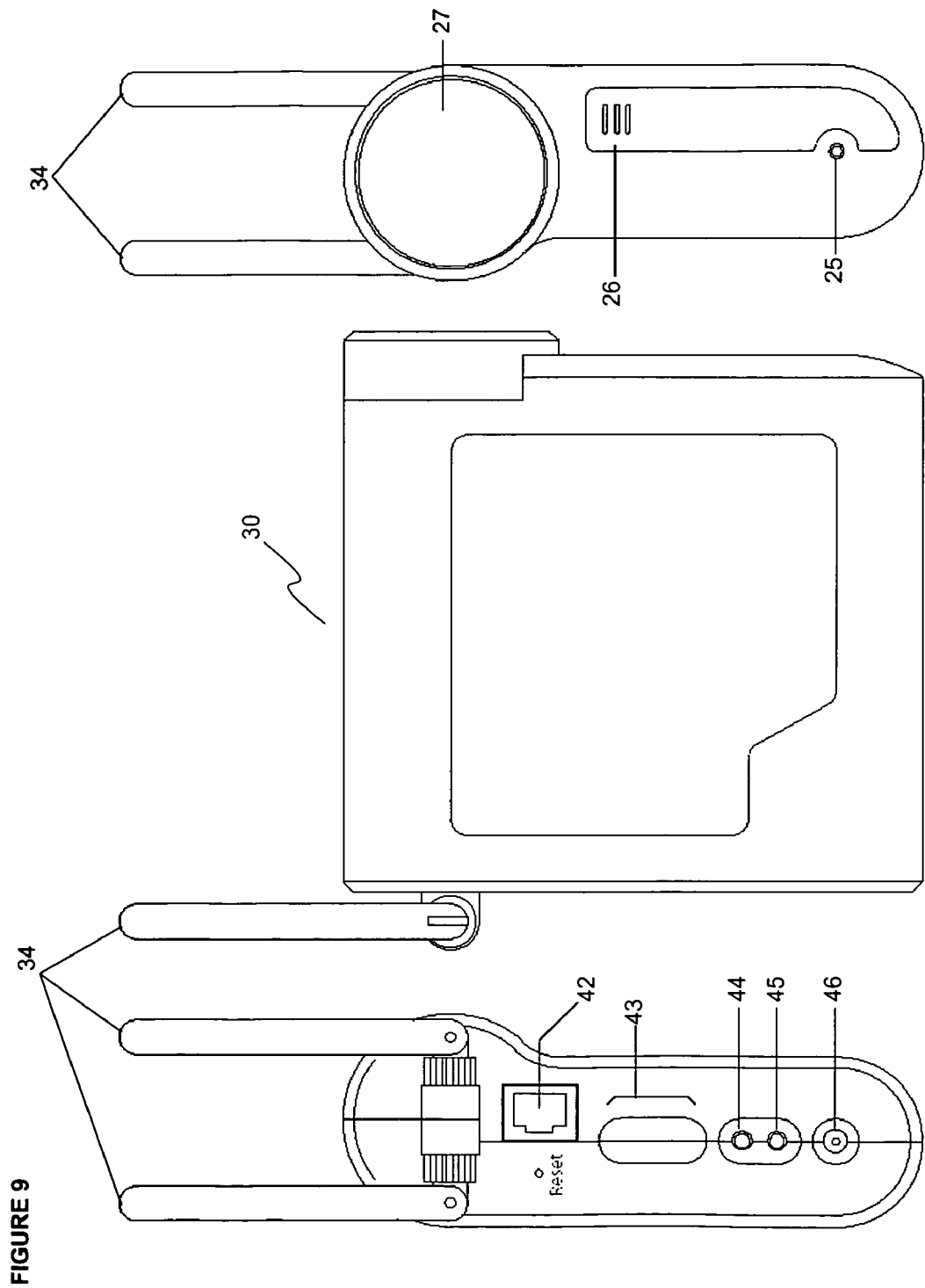
FIG. 9 shows a back, side, and front view of the input capture device component of FIG. 4.

FIG. 9 shows a back, side, and front view of an alternative embodiment of the ICD 30 component of FIG. 5. The ICD 30 is similar to that previously described except the air vents 41 have been removed and the antennas 34 have been positioned to the back of the ICD. Additionally, FIG. 9 illustrates the ICD with the removable tilt adjustable base 33 removed.

Figure 10:
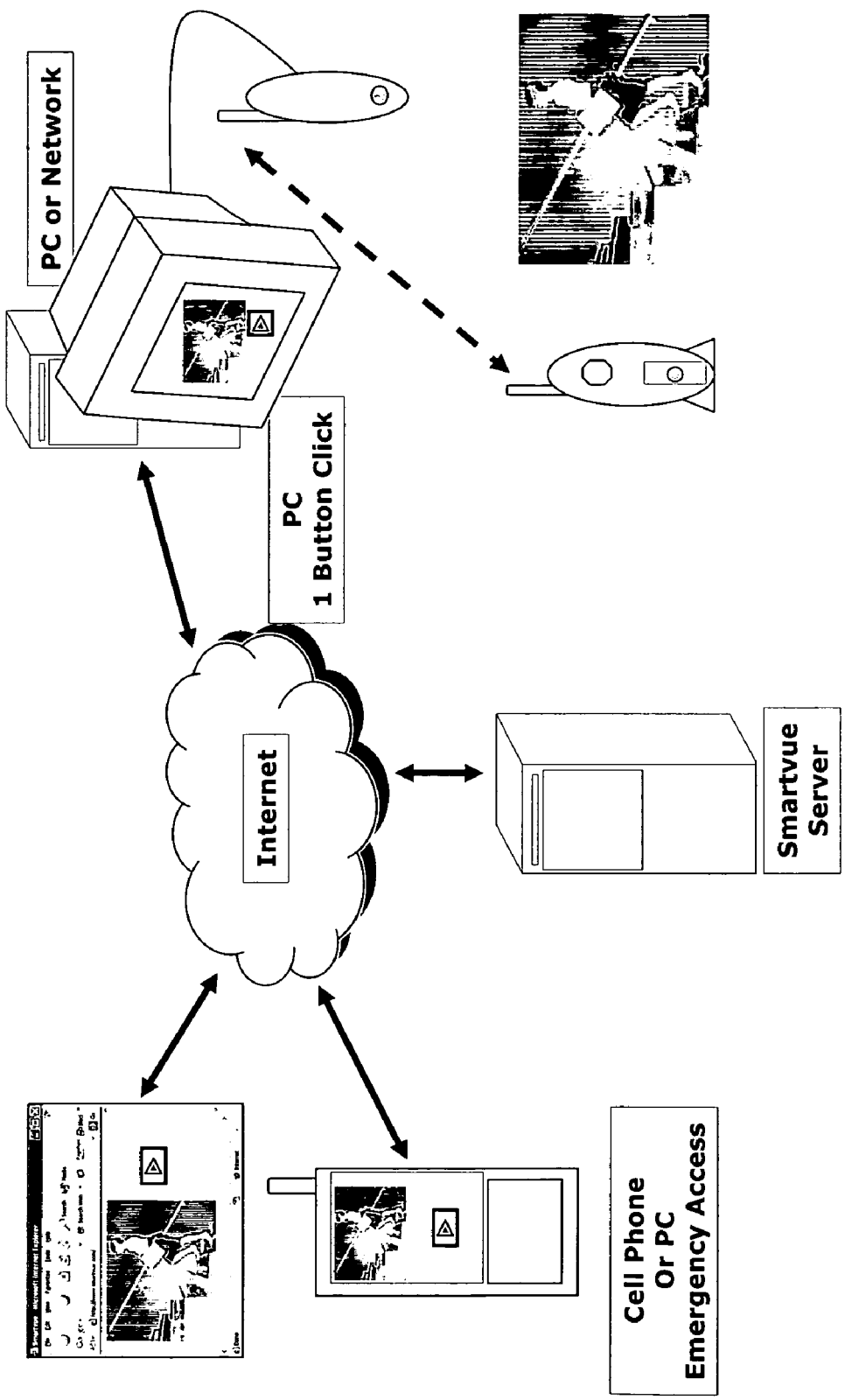
FIG. 10 is a schematic showing the interconnection of remote units of the system.

FIG. 10 shows a schematic showing the interconnection of remote units of the system.

Figure 11:
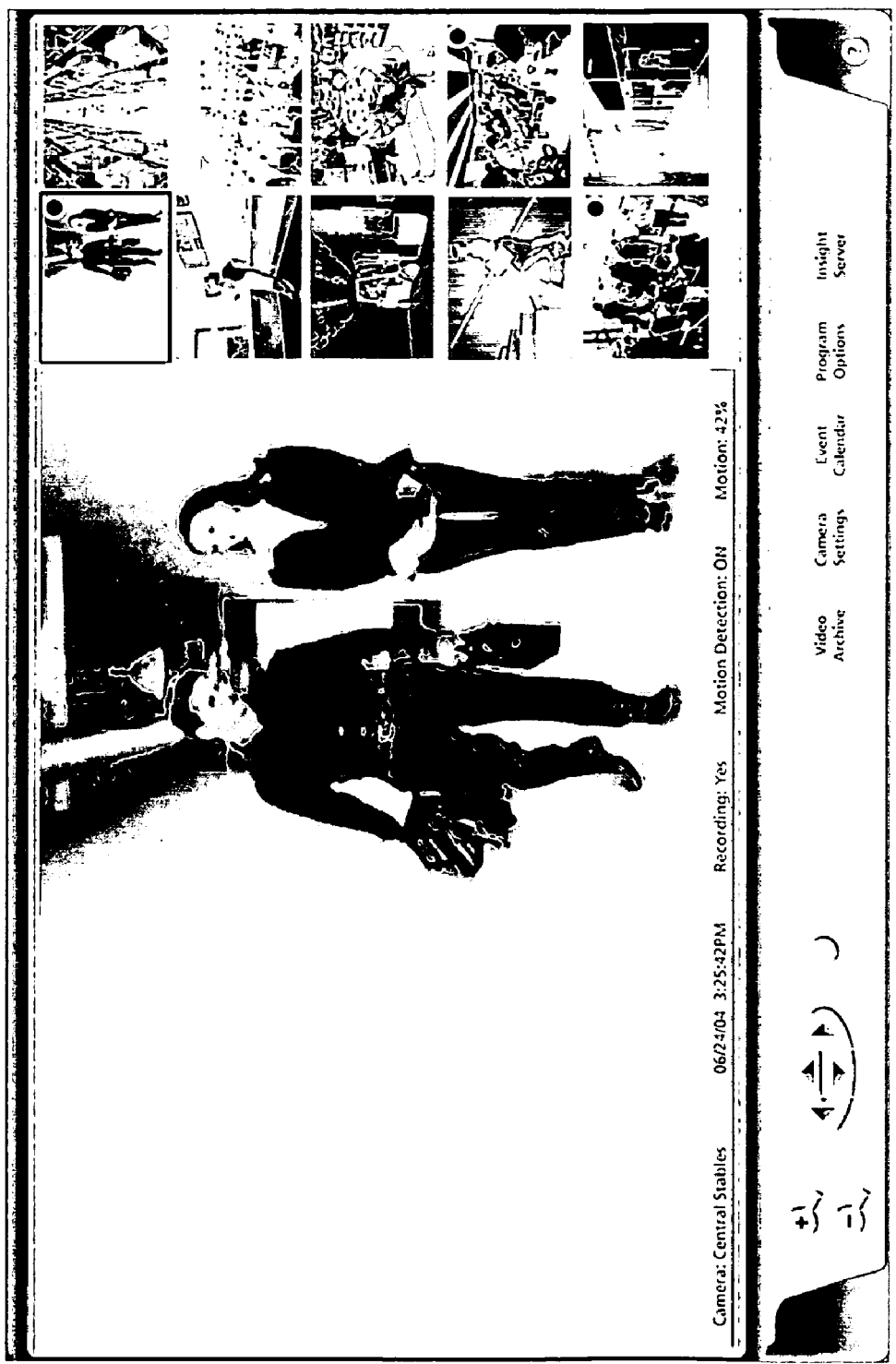
FIG. 11 is a user interface view of inputs to the system viewable by a user.

FIG. 11 shows another user interface view of inputs to the system viewable by a user.

The wireless surveillance system according to the present invention includes at least one wireless input capture device (ICD) for sensing, capturing and transmitting surveillance inputs from a predetermined input capture location, and a digital input recorder device (DIR) for receiving the surveillance inputs from the at least one wireless ICD and storing those inputs, which are capable of being reviewed by a system user on a controller/server computer, wherein the server computer is optionally used for communication with the ICDs and DIRs. In one embodiment of the present invention, the at least one ICD and corresponding DIR device are used to form the system without requiring a separate server computer. The DIR itself has full capabilities when arranged for communication wirelessly with ICDs for recording and controlling inputs to the system, as well as settings for each of the at least one ICD, including activation of each.

Input Capture Device(s) (ICDs)

On the front end of the system, the at least one wireless ICD further includes a power source, a power converter; soft power down component which provides for a gentle power down so that ICD settings are preserved and not lost. Preferably, while the ICD is wireless, it further includes an optional network connection at a back side of the ICD also, so it can be hardwired into a network.

The ICD also includes at least one sensor and at least one input component for detecting and recording inputs, a processor, a memory, a transmitter/receiver, and optionally, at least indicator light for indicating camera activities, all constructed and configured in electronic connection. By way of example and not limitation, the at least one input component may include a microphone, and/or a camera. In one preferred embodiment of the present invention, the at least one wireless ICD includes two antennas for providing a wireless signal for receiving and/or transmitting data with the DIR device or another ICD(s). The ICDs are operable for cross-communication with each other, including data exchange, wherein the data exchange includes information about the surveillance environment, settings, inputs, and combinations thereof. The at least one wireless ICD further includes a housing having a removable casing around the lens to make lens adjustments or settings; ICD adjustments and settings are preferably optional, and are not usually required in preferred embodiments of the present invention, as the DIR device automatically establishes and controls the ICD settings and activities for each of the at least one wireless ICDs associated with the particular DIR device.

For the preferred embodiments where the ICD includes a digital video camera (DVC) having a lens and corresponding camera components, the camera further includes a computer chip providing for capabilities of performing video compression within the ICD itself. The ICD as a wireless digital video camera is capable of capturing video within its range within the surveillance environment and compressing the captured video into a data stream, the capture occurring at predetermined dates and times, during activity detection, and/or on command from the wireless DIR associated therewith. In the case of video, the images are adjustable to capture at different sizes, different frame rates, and/or to include the display of the name of the device (determined by the user and/or the system), the date, the time, and combinations thereof. The ICD including a DVC is capable of capturing images that are combinable and/or integratable with the video data stream and/or compressible into an individual image data stream, all at predetermined dates and times, when activity such as motion or audio are detected, on command from the wireless DVR, and combinations thereof. As with video capture, image capture is adjustable to capture at different sizes, different frame rates, and/or to include the display of the name of the device (determined by the user and/or the system), the date, the time, and combinations thereof. A data stream of images is transmittable wirelessly to the wireless DVR.

Similarly, where the at least one ICD has audio capabilities, the captured audio, which is combinable and/or integratable with other inputs captured by the ICD sensors, is compressible into an individual audio data stream, which is transmittable wirelessly to the DIR. The activity of audio ICD is activatable at predetermined dates and times, during activity detection, and/or on command from the wireless DIR associated therewith. The audio ICD is further adjustable to capture audio at different or variable rates.

Preferably, since the ICD generates heat during operation, the ICD housing includes a cooling system having a vent and a low noise cooling fan. Since the video components of ICDs generate heat that must be dissipated for optimal performance of the system, preferred embodiments of the present invention include housing units with components that operate at lower temperatures, i.e., which generate less heat during operation, and include housing units formed of materials that dissipate heat well, and may include a combination of materials, such as metals and synthetic plastics or composites. While ICDs are preferably used for indoor applications, waterproofing and weather proofing housing units and other components for sealing the housing against water and weather are used for outdoor applications of the present invention. By way of example, sealed or gasketed casing, weatherproof venting and fan components to prevent water blowing into or being sucked into the case, are used for outdoor ICD units.

Other components optional to the housing unit but preferred for ease of use of the system include a removable filter collar on a front end of the camera lens, which facilitates user access for changing the filter and/or to provide a different filter, such as a polarization filter or a specialty filter, for example, to reduce light input or camera aperture.

The ICDs of the present invention are capable of detecting motion, capturing video, detecting and/or capturing audio, providing at least one data stream capability, including video, compressed video, audio, and combinations thereof. The at least one ICD is capable of capturing video, which is compressible into a data stream, and transmittable wirelessly to the DIR device, with the ICD audio data or other input data, such as temperature, humidity, chemical presence, radiation, and other input data, depending upon the sensors and intake means of each ICD, being combinable and/or integratable with the video data stream. Thus, while the ICDs each include at least one sensor for detection and at least one capture input means, preferably each of the ICDs include at least two sensors and input means for image and/or video, and audio capture. In a preferred embodiment, at least two sensor types are used, audio and image or video sensors. The at least one indicator is included with the ICD to indicate that the power is "on", and to indicate that motion and/or audio being detected. The indicator is activatable when motion and/or audio is detected in a predetermined area and/or in a predetermined amount within the environment.

Each of the at least one ICDs is constructed for configuration that is capable of wireless communication (2-way) with the corresponding DIR device and/or any other ICD(s), which when configured provide a system for wireless electronic surveillance of an environment. In a preferred embodiment of the present invention, the ICDs are provided with multiple input multiple output (MIMO) wireless capability. Other wireless communication may be provided instead of MIMO.

Night vision for ICD video input capture may be provided using an infrared (IR) light source, so that the video recorded may be effective in low- to no-light conditions. Image or video input capture may be provided in a range of resolution, in black/white, in color, and sized based upon inputs from the DIR device and/or controller/server computer by an authorized user of the system, and are modifiable after setup of the system by modifying controls remotely, and/or by modifying hardware.

The ICD further includes at least one chip that makes the device an intelligent appliance, permitting functions to be performed by the ICD itself without requiring software installation or the DIR, including but not limited to sensor and input controls, such as camera digital zoom, pan left and right, tilt up and down; image or video brightness, contrast, saturation, resolution, size, motion and audio detection settings, recording settings, communication with other ICDs; and single chip video compression (single DSP). The ICD also includes a sensor with ability for high dynamic range for inputs. Preferred embodiments of a system according to the present invention includes video technology commercially provided by PIXIM, and set forth under U.S. Pat. Nos. 6,791,611; 6,788,237; 6,778,212; 6,765,619; 6,737,626; 6,726,103; 6,693,575; 6,680,748; 6,665,012; 6,552,746; 6,545,258; 6,542,189; 6,518,909; 6,507,083; 6,498,576; 6,498,336; 6,452,152; 6,380,880; and 6,310,571.

The ICD further includes a stand to support the device; the stand may be included with, integral with, or attached to the housing. The stand is constructed and configured to be mountable to a wall, suspend from ceiling, and provide a variety of stable positions for the ICD to capture as much data from a given environment as appropriate, given the space, conditions, and input capture type desired. Importantly, the stand serves as a stable base to tilt the ICD for camera direction up and down, and/or side to side. The stand is movable between positions but retains a fixed position by a predetermined friction to ensure so that the ICD stays in place wherever the positioning was last stopped. The base and stand of the ICD is constructed such that it does not require mounting to a surface to provide stability. The adjustability and mobility of the device are significant features of the present invention to ensure optimal surveillance and easy setup.

Furthermore, the stand is weight balanced for good center of gravity to support the adjustment on the stand for stability on the entire range of motion for the ICD on its stand; since motion of the ICD is adjustable and provides for dynamic range of motion when the ICD is in use, the stand construction enables remote modification of settings without requiring the user of the system to readjust or optimize the ICD positioning in person.

The ICD preferably is constructed and configured for a range of coverage, which can vary depending upon the conditions and limitations of a particular target environment. In a preferred embodiment of the system, the ICD has a range of coverage with a target range of at least up to 250 ft. The ICDs are capable of having a range of up to 300 meters, with an active wireless range from 1-1000 ft linear feet indoors. Advantageously, the ICD can be configured and activated quickly for quick start up of a surveillance system in the target environment. Additionally, the ICDs have the ability to communicate with one another to act as a data repeater and extend the usable wireless range to 3,000 meters and more.

Significantly, no adjustments to camera settings, such as focus and focal length, are required after camera installation; ICD settings are preadjusted and further controllable remotely by the DIR and/or RSC and/or other ICD(s). By contrast, in the prior art, adjustments are usually always required for surveillance cameras following installation. Preprogrammed settings may be provided, with automatic and remote adjustment capabilities. Where the ICD is a video camera, the settings may include focus, resolution, etc.

Each of the at least one ICD is constructed to optimally reduce heat from particular heat-generating components. In a preferred embodiment of the present invention, the ICD includes a plastic case with metal sides to reduce heat while the system is running. Also, a back plate of the ICD or camera is all metal to increase heat dissipation, and to optimize weight and heat management, which important where there is a lot of power involved, as with wireless video input devices. Also, significantly, the ICDs and/or DIR devices are constructed with a separate chamber for imaging components to reduce heat. It is known that heat is not good for imaging sensors or equipment; however, cooling fans can generate noise, which is preferably minimized with security systems and components therein. The camera is configured to communicate with an imaging board with a flexible electronics communication cable, which permits the camera to have a separate chamber for optimized heat reduction. This is a problem specific to wireless cameras that has not been successfully addressed in the prior art.

The ICD also includes at least one and preferably two antenna that are removable, including standard antennae, which may be substituted for a patch antenna and/or a long range antenna.

The inputs captured by ICDs are provided to the DIR for which output for RCA viewing is available, such as connecting a monitor with a user interface for remote viewing of video from video cameras. In this case the setup easier because the remote user can see what the camera views from the monitor, which is removably connectable to the system. The ICD and DIR also have an optional network connection at the back side, so the devices can be hardwired into the network, if appropriate; however, wireless connections are preferred.

Additionally, the ICDs have inputs, such as video and microphone, and at least one indicator light. In the case of a wireless video camera, the housing includes an easily removable casing around the lens to make lens adjustments or settings, which optional, and not usually required.

Additionally, the ICDs have the ability to communicate with one another to exchange data about the environment and all control settings and other settings of any other ICDs.

Digital Input Recorder Device (DIR Device)

The wireless DIR device communicates directly with the at least one ICD, and, in embodiments where the controller/server is included in the system, the DIR device also communicates with the controller server to send data streams to the server and receive data or instruction from the controller/server to control its properties. In the case of a video camera for at least one ICD, the DIR may also be referred to as a digital video recorder device (DVR).

Surprisingly, compared with prior art surveillance systems, the DIR device functions as an appliance, which permits a rapid setup of the system. Significantly, since the DIR device operates as an appliance, there is no software installation involved in the basic system setup. The preferred embodiments of the present invention including at least one ICD and a corresponding DIR device permit for setup and recordation of inputs to the system from the observation or surveillance environment with one click activation by the user/installer, generally in less than ten minutes from start to finish. Such rapid setup, including installation and activation to recording of the system, is not possible with prior art systems, given their complex components, interactivity via transmission lines, and/or software installations, which typically require an expert or trained specialist to ensure proper setup, installation, activation, and testing of the system prior to ongoing operation. By sharp contrast, the preferred embodiments of the present invention provide for one click activation for receiving and recording inputs to the at least one wireless ICD, i.e., for activating the ICD capability to record designated dates and times, when a surveillance event, a motion event or an audio event is detected by at least one of the at least one ICDs in the system, immediately after the rapid setup is complete.

Furthermore, the system provides for rapid settings adjustment, including settings for sensitivity of ICD motion and audio detection; preferably, the settings adjustment is made by the user through the DIR device. The user simply sets a surveillance area for observation and data capture by each ICD of the at least one wireless ICD; for video capture, using an ICD with a digital camera, the camera may be set to focus on a predetermined location within the area, such as a window, a door, and the like. While the settings are practically a function of the ICD itself, the DIR device, which is also wireless, functions to control the settings of each of the corresponding ICDs associated with that DIR device. Other functions performed by the DIR device include, but are not limited to printing, saving or storing recorded inputs from the ICDs, transferring data to a removable storage device, such as a USB storage key device.

Also, a power supply and a soft power down function is provided, similar to the ICD soft power down, to preserve the settings of the DIR device in the event of power termination to the device.

The DIR is capable of running software for managing input from the at least one wireless ICD associated with or corresponding to a particular DIR device after installation. With the software, the DIR is capable of intaking and managing up to 16 data streams simultaneously; allowing the user to control the ICD unit, including allowing the user to zoom, pan, and tilt the camera, as well as managing microphone sensitivity. Sensitivity controls for other ICD input means, such as heat or temperature, chemical substance presence, radiation detection, and the like may be controlled remotely from the wireless DIR device as well. Other DIR device control functions for controlling the ICDs include but are not limited to controlling brightness, contrast, color saturation, where images and video are involved.

Other software-based functions capable of being performed by the DIR include sending text message, sending still image, sending email or other communication to a user on a remote communications device; usually, these functions are programmed to occur upon the occurrence of an event. DIR data recordation and storage overwrite may be based on settings that enable newer data to overwrite older data. Additionally, the DIR may be programmed to include overwrite protection to prevent overwriting of event video, audio, or other input data captured by the ICD and transmitted to the DIR device. Preferably, the DIR includes capabilities of data search and display, data archiving to external device, network, computer, server, and combinations thereof, data printing, data exporting, data deletion, data playback, and combinations thereof. Data playback includes play, fast forward, rewind or reverse, frame by frame step forward or backward, pause, and combinations thereof.

In a preferred embodiment of the present invention, the system includes a DIR device running software that is capable of automatically upgrading its own software, which eliminates user maintenance, upgrading, or other activity to optimize system performance.

The DIR's capabilities of adjusting settings and/or controls for the at least one ICDs includes any functions of the ICDs, including but not limited to zoom pan and tilt, color brightness, contrast, saturation, sharpness, frame rate, video and/or image size, audio rate, wireless control data, encryption and security data, set motion and/or audio detection area and/or levels, set recording, set triggers, record on command, and combinations thereof.

The DIR is preferably capable of connecting directly to a computer or a computer network, more specifically connecting to a personal computer via a USB or similar connection and to a network using a network cable or similar connector, with the DIR interface being accessible after such connection through a user interface or a web browser, respectively; and capable of sending data and/or alert or warning to a cell phone or computer via a signal or message such as by voice or email.

Also, the DIR is capable of performing a backup of the ICD inputs, including video, to a network, a personal computer (PC), computer readable medium (CRM) or other storage device. The DIR may be programmed to lock to predetermined ICDs having cameras, to maintain integrity of camera signal to DIR device.

In a preferred embodiment of the present invention, the user interface of the ICD inputs on the DIR device include at least one visual cue on the video to tell whether video is being recorded, e.g., a red and/or green dot is shown on the image. Also, preferably, the DIR device has a front with indicator lights that match or correspond to these same visual cues. For quality checking purposes, similarities such as these provide ease of use for the system user to confirm system functionality upon inspection.

The DIR device is programmable for wireless communication with input capture device, including both transmitting data, settings, controlling instructions and receiving input captured from the ICD, like images, video, audio, temperature, humidity, chemical presence, radiation, and the like. Thus, the DIR device is capable of receiving wireless data from the wireless input capture device(s), indicating which of the ICDs is active, recording data and storing data, searching through recorded data, transmitting data and instructions to the ICD, adjusting ICD settings and/or controls, communicating with the controller/server computer to send and/or receive data, and other functions, depending upon the specifications of the system setup, the environment under surveillance, and whether or not remote access is used via the controller/server computer and Internet.

The DIR device's data recordation and storage capability permit inputs from a multiplicity of ICDs to be associated with each DIR device to be singularly received, recorded, stored, and researched by a remote user from the ICDs. The user can search historically recorded data by date, time, event type, or any other means of selecting a setting or event corresponding to the each or any of the ICDs and the environment under surveillance by the system. Each of the ICDs is capable of individualized settings control by a single DIR device; a multiplicity of DIR devices may be controlled and managed by the controller/server, either within a given surveillance environment or in different locations.

Other components of the DIR device include, but are not limited to having a base that may be optionally adjustable for optimized mounting on a surface; having a long range MIMO wireless component; having a one-chip video compression component for resizing video data, recompressing it, and streaming it; having a USB port connectable to a computer, or for storage key, or removable hard drive for data storage; having an ethernet port to connect to a network; having RCA video output like the ICDs; having 2 or 3 USB ports for data output as well as for a USB based security key, having at least one antenna, preferably three antennae, which may be removable and replaceable; having a power control button on the housing; having a recessed reset button in the housing, accessible on the backside of the housing; having a low noise fan; having a hard drive for recording inputs; and/or having at least one, preferably a multiplicity of indicators, preferably light emitting diodes (LEDs), that are viewable by a user on the outside of the housing of the DIR device.

By way of example, in a preferred embodiment of the present invention, the DIR device has ten LEDs on the front of the housing, each of which correspond to an individual ICD. Significantly, these indicators, in particular as LEDs, provide content dense visual information with a quick glance from the user. There are five modes that represent ICD status, illustrated for one embodiment in the following table, Table 1:

| LED INDICATOR | CORRESPONDING STATUS |
| --- | --- |
| Off | ICD off |
| Green | ICD connected to DIR device |
| Flashing Green | DIR recording inputs from the ICD |
| Flashing Red | ICD detecting at least one event |
| Red | Error warning |

The error warning may be due to a variety of conditions, such as, by way of example and not limitation, lost connection between the ICD and DIR device, data loss, throughput reduction, etc. In a preferred embodiment of the present invention, each LED that represents an ICD has a light color and flash as described hereinabove, but also shows a number to indicate which camera has the activity and its corresponding section of the target environment, e.g., camera #1 shows the front entrance doorway view.

The optional remote controller or server computer (RSC) runs software providing for remote access and control, and is separate from the wireless DIR. Users log in with a username and password from any Internet connected PC, web enabled cell phone, or other Internet enabled or network communicable device, to remotely access or review the wireless input or camera video and/or image(s). The user accesses the system through a user interface operating in connection with a web browser. The RSC communicates directly with the wireless DIR and enables users to remotely configure wireless DIR properties and the ICD properties, and, preferably to perform any of the functions that are directly performable for any DIR or ICD, such functions being set forth in the foregoing. The RSC may provide an electronic commerce function such as providing a user to pay for remote access service. The RSC provides an authorized user remote from the target surveillance environment the option of logging into the system, selecting any ICD for monitoring, e.g., select any camera input from any DIR, print, save, email image from the input, such as a video clip, and zoom, pan and tilt live video through the DIR, similar control and/or access activities, and combinations thereof.

The RSC functions as a remote monitoring station like a personal computer and is capable of providing a user interface that is accessible through a web browser; the RSC is thus any Internet connectable device, including computer, PDA, cell phone, watch, any network accessible device, and the like, which provides access for at least one remote user. The at least one remote user is preferably a predetermined, authorized user.

Users of the system are preferably authorized, whether access is direct or remote. Apart from direct access, authorization may also determine levels of access for each user. While all capabilities of the DIR and ICDs are controllable remotely, either by the DIR itself or by an Internet communicable device in communication with a server computer that communicates with the DIR(s), the number and type of devices may be limited based upon authorization level of a user.

The RSC provides for user remote access to live and/or recorded audio and/or video for any camera on any DVR; furthermore, control functions permit this user(s) to adjust and to make changes to any DVR or ICD settings remotely. Also, off-line archiving is operable via the user selecting to remotely record to the RSC.

DIR and ICD Communication Locking

In one embodiment of the present invention, a method for locking communication between at least one wireless input capture device ICD(s) and a corresponding digital input recorder (DIR) or other ICD(s), either one-way and/or two-way, is provided, including the steps of providing base system; at least one user accessing the DIR via user interface either directly or remotely; the DIR and/or ICD(s) searching for signal from the ICD(s) and establishing communication with them; and locking the ICDs to send wireless data exclusively to that DIR or ICD; and/or the DIR or ICD locking itself for exclusive communication with the locked ICDs, thereby providing a secure surveillance system for a target environment.

DIR Activation and ICD Searching

The ICD is activated when at least one user accesses the DIR software by either launching the software directly or launching the DIR device or by clicking on or click selecting an activation or start button from the user interface or directly on the device for triggering activity steps within the software and hardware system to activate communication including data exchange between predetermined DIRs and their corresponding selected ICDs. In a preferred embodiment of the present invention the at least one ICD includes a wireless digital camera and the corresponding DIR is a DVR; however, one of ordinary skill in the art will appreciate that the functionality applies to a range of ICDs and corresponding DIRs, with or without video capabilities in each case. When any of these events occur, the DIR initiates checking for signals from prior configured capture devices. If the DIR starts without any prior configured capture devices, then the DIR automatically begins searching for wireless signals from capture devices. If the DIR starts with prior configured capture devices and the user wants to add additional devices, the user clicks on a search button or click select option within the user interface, and the DIR begins searching for wireless signals from capture devices not already configured and communicating with the DIR.

Communication

In a preferred embodiment of the present invention, the DIR is operable to identify signal(s) from the at least one ICD corresponding thereto, and the DIR automatically establishes communication with the identified capture device and creates a named representation 220, such as an icon or image with a name that represents the active ICD. Also, the DVR is operable to create a named representation for each of the corresponding ICDs associated with that DVR that are identified but not in active communication with the DVR at that time. The non-communication status of these devices is denoted in the representation, for example by at least one indicator having at least one status, as set forth in the foregoing (see, e.g., Table 1). Then, the wireless digital video camera as ICD is operable to send a still image to the DVR interface for the user to confirm identity of the ICD sending the image. The user may rename the ICD at that time or at a subsequent time. Importantly, no additional user steps are required to establish the monitoring set-up.

Camera Validation/Communication Optimization

The DVR is further operable to validate the device approval status for communication with the specific DVR and optimizes the wireless signal to the DVR to ensure the greatest information throughput.

Camera Locking/Security Establishment

Preferably, security functionality is operable when a DIR automatically locks a specific ICD, such as to permit sending wireless data only to that specific DIR and automatically initiating security on the data stream. The security methods may include cryptographic methods such as digital signing, stream cipher encryption, block cipher encryption, and public key encryption or hardware based encryption in which each device has a hardware device for encryption included. By way of example and not limitation, WAP, 802.11i, AES, SSL, stream cipher, Trojan, DES, any other type of security protocol, and combinations thereof may be used.

DIR Locking

Any of the DIRs operable within the system and having at least one ICD associated therewith are further operable to be locked to prevent setting changes or data manipulation from any device apart from the DIR with which each ICD is locked into communication. In one embodiment of the present invention having video cabilities, the DVR as DIR, upon confirming detection of all the signal(s) from ICD(s) associated therewith, confirms the establishment of communication with each detected ICD, in particular wireless digital video camera, and locks the DVR to only communicate with the found device(s), unless it receives instruction from the user to look for other signal(s). The DVR indicates such a locked status, for example, by displaying a lock indicator on the DVR and/or on the ICD to provide an external visual status indication that the ICD(s) are locked and also sends a lock status signal to an entity outside the present system, such as to the RSC and/or an alarm system or security software. Once searching and locking is complete, the DVR will not accept signals from capture devices that are not locked to the DVR, unless directed to search for capture devices by the user by click-selecting the search button. Alternatively, the system can notify the user of new ICDs that come into communication with the system during operation and/or after initial setup has occurred.

Camera Removal

ICDs may be removed from operation and/or operational communication or interaction with the system. To remove a capture device from the DVR system, the user click-selects from the user interface on an image and/or name that represents the capture device they want removed and then click-selects a single removal button or click select option on the user interface. The DIR then removes that capture device from the system.

DVR-Based Querying

The present invention provides a method of providing digital image recorder (DIR)-based querying including the steps of: providing a system having polling capabilities and digital input security, the system having at least one wireless input capture device and at least one DIR; providing a computer system or network operable to permit a user to connect to the Internet for accessing at least one of the wireless input capture device(s) without requiring any additional steps to be performed by the user. In a preferred embodiment of the present invention, a method of providing digital input recorder (DIR) based querying includes the steps of:

providing a system for wireless surveillance of a target environment, the system including at least one wireless input capture device (ICD), at least one digital input recorder (DIR), which has polling capabilities, configured and operable for wireless communication with the ICDs, and a remote server computer (RSC) configured and operable for communication with the DIR for permitting the system to be accessed remotely via the Internet by an authorized user;

an authorized user connecting to Internet and logging into the system;

the DIR communicating with the RSC to transmit input data from the ICDs and/or to receive posted information or data from the RSC for its review upon polling;

alternatively, the DIR connects to Internet via a USB or direct network connection;

the DIR polls the RSC on predetermined intervals, such as every 1-60 seconds;

the user logs into RSC with an authorized username and password, the user selects a DIR either by searching or from a list, the user enters an instruction, command, or setting for the DIR, such as to display a specific ICD, e.g., by selecting from a list, or change capabilities of an ICD or the DIR;

the DIR polls the RSC on predetermined intervals for direction and responds as needed;

in such a configuration, the RSC does not send instructions directly to the DIR, but posts for the DIR to access the directive or instruction, which the DIR receives during polling;

thereby removing restraints against inbound network traffic and changing IP addresses, as well as eliminating firewall limitations, since all network traffic is outbound from the DIR;

the user accessing at least one of the wireless input capture device(s) through the DIR after its polling and receipt of posted instruction; with no additional steps required to be performed by the user for remote accessing the inputs captured by the ICDs.

Certain modifications and improvements will occur to those skilled in the art upon a reading of the foregoing description. All modifications and improvements have been deleted herein for the sake of conciseness and readability but are properly within the scope of the claims.

What is claimed is:

1. A wireless surveillance system including:
   at least one input capture device (ICD) having input sensors operable for capturing data input from activities within a target environment, the at least one ICD operable for direct cross-communication, including data exchange, with one or more other ICDs through a wireless communication network;
   a remote server computer (RSC) with software operable thereon for providing automated functions selected from analytics, data storage, reporting, device management, control, and combinations thereof;
   a digital video management and/or recording device (DVM) communicates wirelessly through the wireless communication network providing wireless communication with the at least one ICD and networked communication with the RSC;
   automatically activating the system based on inputs provided through a user interface on a remote computer;
   capturing data inputs via the input capture device(s);
   software analyzing the captured data inputs and generating a report that is viewable by the user on a display associated with the remote computer.

2. The system of claim 1, wherein the RSC further includes the user interface on a display.

3. The system of claim 2, wherein a user interacts with the system via the user interface to selectively control functions of the system.

4. The system of claim 1, wherein the ICDs are functional and operable to capture video, audio, and/or data from sensors such as temperature and humidity data from specific geographic locations and wherein the RSC is operable to collect and analyze the data and to provide a single report relating all ICD data.

5. The system of claim 1, further includes adding at least one additional DVM to the system when the RSC receives inputs for selecting a subset or the complete group of cameras related to each DVM to be added to a server application.

6. The system of claim 5, further includes the user selecting via user interface options at least one of the ICDs to be managed and displayed.

* * * * *